United States Patent [19]

Lederman

[11] Patent Number: 5,492,337
[45] Date of Patent: Feb. 20, 1996

[54] ROTARY SPRING LOADED SEAL ASSEMBLY

[75] Inventor: Frederick E. Lederman, Sandusky, Ohio

[73] Assignee: General Motors Corporation, Detroit, Mich.

[21] Appl. No.: 250,878

[22] Filed: May 31, 1994

[51] Int. Cl.$^6$ .................................................... F16T 15/32
[52] U.S. Cl. .......................... 277/1; 277/81 R; 277/96.1; 277/95
[58] Field of Search .................................. 277/35, 37, 38, 277/39, 40, 81 R, 88, 90, 96, 96.1, 96.2, 152, 65, 95, 1

[56] References Cited

U.S. PATENT DOCUMENTS

| | | | |
|---|---|---|---|
| 2,445,018 | 7/1948 | Brady, Jr. | 277/40 |
| 2,760,794 | 8/1956 | Hartranft | 286/11.14 |
| 2,868,562 | 1/1959 | Heimbuch | 277/38 |
| 4,497,495 | 2/1985 | Christiansen | 277/50 |
| 4,596,394 | 6/1986 | Schmitt | 277/152 |
| 4,841,183 | 6/1989 | Dohogne et al. | 310/90 |
| 4,988,220 | 1/1991 | Christiansen et al. | 384/448 |
| 5,096,207 | 3/1992 | Seeh | 277/152 |
| 5,201,533 | 4/1993 | Lederman | 277/152 |
| 5,207,436 | 5/1993 | Lederman | 277/96.2 |

Primary Examiner—Daniel G. DePumpo
Attorney, Agent, or Firm—P. M. Griffin

[57] ABSTRACT

A seal assembly for a vehicle wheel assembly is provided for use between its two relatively rotatable coaxial parts, to seal the bearing chamber. The seal assembly includes a pair of nested casings forming a C-shaped recess in cross section. An annular wafer seal is disposed within the recess and pressed firmly against the adjacent sealing surface by inside and outside frustoconical springs. The inner and outer peripheral edges of the wafer seal form two seal interfaces along circular lines of contact. In addition, the center ring section of the wafer seal is attached by adhesive to a generally flat, annular face of one of the casings. In accordance with the method of assembly/installation, the springs are first installed and retained on the casing to which the seal is attached, thereby urging the peripheral edges of the wafer seal away from it. The casings are then pressed together, flexing the peripheral edges in the opposite direction and forming the circular lines of contact for sealing.

4 Claims, 3 Drawing Sheets

ROTARY SPRING LOADED SEAL ASSEMBLY

TECHNICAL FIELD

The present invention relates to seal assemblies in general, and more particularly, to a seal assembly utilizing an annular wafer seal biased around a peripheral edge/lips into stable sealing contact with an adjacent sealing surface and forming an enhanced sealing interface along a circular line of contact.

BACKGROUND OF INVENTION

In its simplest form, a seal assembly for a rotary bearing or the like, such as used for sealing the wheel spindle assembly of a vehicle, includes at least one annular flexible seal member attached to a seal casing. The seal most often takes the form of one or more flexible members each having a lip urged against an opposed casing or other member to form a sealing interface around the circular line/face of contact. This sealing action allows relative rotation between the coaxial, rotating component parts, while maintaining good seal efficiency to prevent entry of foreign material into the wheel spindle bearing, such as salt, road grime and other debris. The seals of prior art seal assemblies are primarily formed of a molded elastomer material such as rubber, but can also be made of less flexible, but lower friction plastic materials, such as polytetrafluoroethelene (PTFE).

Especially in the area of wheel spindle technology, a seal assembly can experience rapid radial and/or axial vibrations between the inner and outer casings. These vibrations can cause instability of the sealing lips and excessive deterioration of the seals, especially along the circular lines/faces of contact with the opposing casing. As the lips of the seals deteriorate, they lose their ability to flex rapidly enough to maintain the critical continuous sealing contact with the opposing casing, and the seal integrity is further eroded. In addition salt, road debris, or other corrosive materials that are commonly encountered in every day use of a vehicle, can accelerate this deterioration and resultant loss of flexibility, thereby further exacerbating the problem. Eventually, contamination of the lubricant within the seal assembly leads to rough bearing operation, along with increased noise and heat, and thus a shortened seal/bearing life.

An example of a type of rotary seal assembly with one or more flexing seal lips providing circular face contact(s), that has had success in use, but tends to be subject to the above disadvantage, includes the seal assembly shown and described in Christiansen U.S. Pat. No. 4,497,495, owned by the assignee of the present invention. As disclosed in this patent, a seal member is attached to an inner casing and has two free lips that flex in response to their own resilient memory against the inside sealing surface of an outer casing to form two seal interfaces. By free flexing contact with an annular casing, the lips facilitate good sealing contact around two circular faces of contact. But as the seal member becomes unstable and deteriorates due to the aforementioned causes, its ability to maintain this flexing contact is impaired, resulting in a reduction in the effectiveness of the seal interfaces.

Another approach that has been proposed for sealing similar rotatable parts relies on the use of a spring to bias a relatively thick, O-ring type seal into sealing contact with an adjacent co-axial, sealing member. Two examples of this type of seal assembly are shown in Pat. No. 2,760,794 issued to Hartranft and U.S. Pat. No. 4,841,183 to Dohogne et al. The '794 patent also teaches the need for the spring to bear against a washer, which in turn, bears against the O-ring. In this manner, the O-ring is indirectly biased into sealing engagement within the adjacent sealing surface. Also, both patents teach face-to-face sealing contact of the seal rather than flexing of a relatively thin sealing lip that provides the more efficient sealing interface along a circular line of contact. Unfortunately, while this type of prior art seal assembly has increased sealing interface stability and works well in relatively shielded environments, it leaves much to be desired in a hostile environment, such as encountered in protecting the bearing assembly of a vehicle wheel spindle assembly.

Thus, the need is identified to provide an improved seal assembly that is not only characterized by improved seal effectiveness and integrity, but also by a longer useful life, especially in relatively hostile environments. Indeed, the present invention discloses a novel solution to the identified problem that is prevalent in such environments as experienced by wheel bearing assemblies for vehicles.

SUMMARY OF THE INVENTION

Accordingly, it is a primary object of the present invention to provide a seal assembly with improved sealing characteristics for use between two relatively rotatable, coaxial parts.

Another object of the invention is to provide a seal assembly having improved sealing characteristics gained by increasing the effectiveness and integrity of the sealing interface.

Another object of the invention is to provide a seal assembly of the type described providing one or more highly stable circular, line of contact sealing interfaces.

Still another object of the invention to provide an improved seal assembly utilizing an annular wafer seal that is firmly biased into sealing contact with an adjacent sealing surface around at least one of its peripheral edges.

It is still another object of the present invention to provide an improved seal assembly, as set forth above, wherein the annular wafer seal has a center section that is attached to an annular face of one casing, and a pair of coaxial springs biasing the inner and outer peripheral edges of the annular wafer seal against an adjacent sealing surface of the opposite casing for enhanced stability.

Still another object of the present invention includes providing a seal assembly having an annular wafer seal attached to one of an inner and outer casings and including radially inner and outer peripheral edges; the seal effectiveness and integrity being maximized by providing highly stable, spring biased seal interfaces adjacent the inner and outer peripheral edges formed against the opposite casing.

Another object of the present invention is to provide a seal assembly as set forth in the previous objective, and wherein the peripheral spring forces provided adjacent the radially inner and outer peripheral edges are directed from said one casing toward the opposite casing with substantially equal force.

Another related object of the invention is to provide such a seal assembly with the inner and outer casings nested together and forming a generally C-shaped recess in cross section with frustoconical compression springs positioned between the casings and substantially conforming to said cross section.

It is still another object of the present invention to provide a related method of assembly, incorporating the described novel features, advantages and enhancements, as generally described in the above objectives, and additionally including the objective of providing a seal assembly that is quickly and easily assembled and installed between two rotatable coaxial parts.

Additional objects, advantages, and other novel features of the invention will be set forth in part in the description that follows and in part will become apparent to those skilled in the art upon examination of the following description, or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a spring loaded seal assembly is provided for sealing two relatively rotatable coaxial parts in a relatively hostile environment, such as the bearings for the wheel spindle assembly of a vehicle. More specifically, the seal assembly includes inner and outer annular casings that are nested together forming a C-shaped recess in cross section. The annular casings are preferably stamped of relatively rigid metal so as to be self supporting when press fitted on their respective coaxial part. An annular wafer seal of elastomeric material is disposed within the C-shaped recess attached to one casing and includes inner and outer peripheral edges or lips that are biased in sealing contact with sealing surface of the other casing. By using an assisting biasing means to force the peripheral edges of a wafer seal into sealing contact, a highly effective seal structure is provided.

The highly effective sealing characteristics of the novel seal assembly are further enhanced by the fact that the seal interfaces of the respective inner and outer peripheral edges are directed in opposite directions. Advantageously, one seal interface is directed inwardly, and the other outwardly, in direct opposition to each other. With this arrangement provided by a single annular wafer seal, it is possible to efficiently prevent entry of contaminants into the bearing chamber, as well as prevent leakage of lubricant from the bearing chamber.

In order to assist the inherent resiliency of seal to bias the peripheral edges into sealing contact, the present invention contemplates use of inside and outside frustoconical springs placed between the casings. The springs urge the respective peripheral edges into sealing contact with the adjacent sealing surface of the opposite casing. In accordance with the objective of increasing seal stability and integrity, the inside and outside springs, compliment the seal in an ideal manner. The springs are resistant to deterioration caused by the aforementioned radial and/or axial vibrations between the inner and outer casings. Further, exposure to harmful foreign material such as road salt and other road debris is less of a factor. Thus, by using springs to provide bias assistance, the peripheral edges of the wafer seal assure full time sealing contact with the opposite casing.

In a further aspect of the invention and in accordance with its objects and purposes, an assembly method is provided including the steps of: (1) placing the inside and outside springs between the one casing and respective peripheral edges of the wafer seal; (2) attaching the center section of a wafer seal to one of the casings; and (3) pressing the inner and outer casings into nested relationship against the outer casing. In this method of assembly, peripheral edges of the wafer seal advantageously compress the two springs slightly, holding them in position. In the final assembly step, the two casings are quickly and easily moved together with the internal components of the seal assembly being assured of being in their proper position. The inner and outer sealing edges are reversed and flexed into engagement with the sealing surfaces on the inner casing as the final assembly is completed.

Still other objects of the present invention will become apparent to those skilled in this art from the following description wherein there is shown and described the preferred embodiments of this invention, simply by way of illustration of two of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
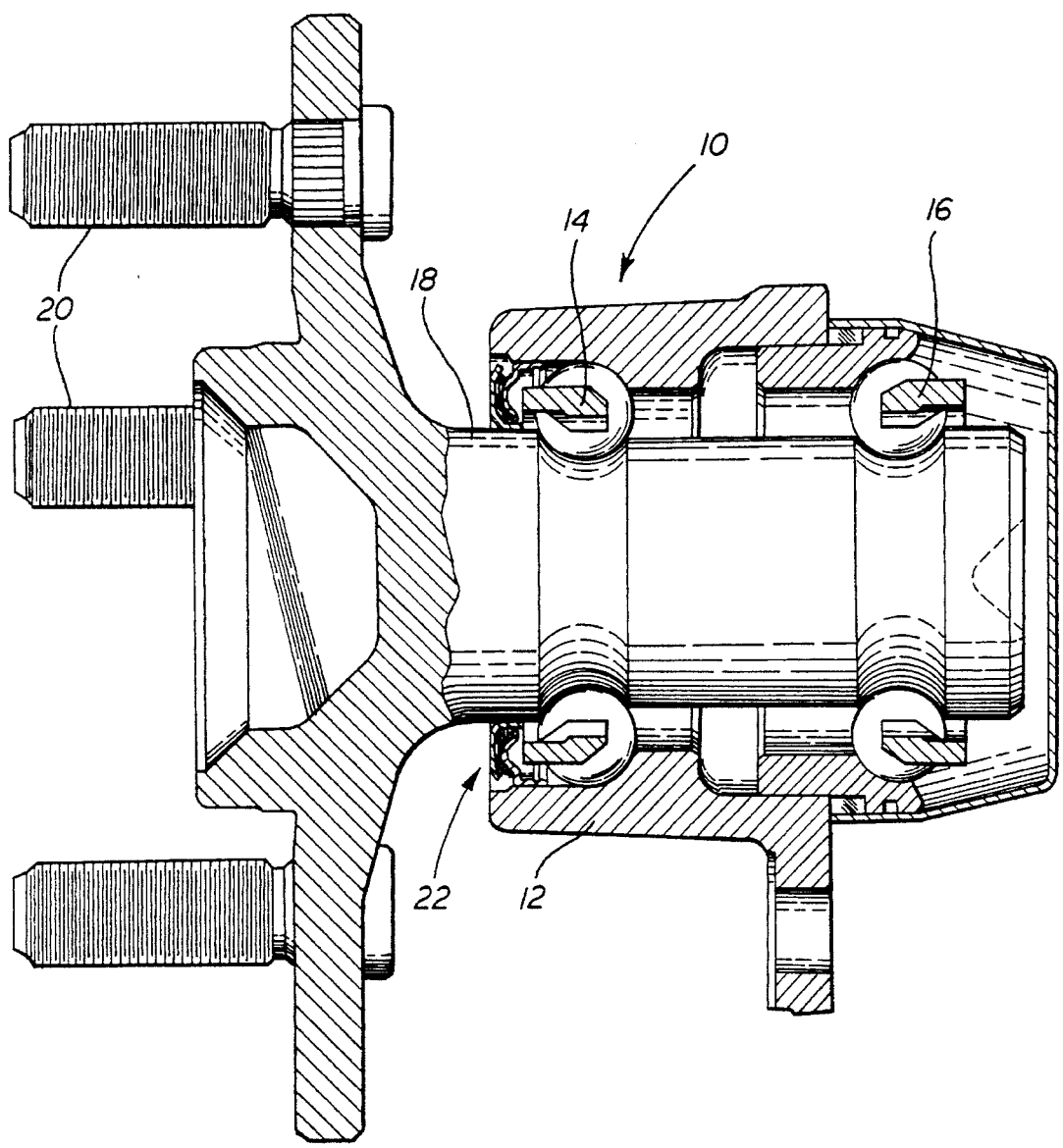
FIG. 1 is a cross-sectional view of a typical wheel spindle bearing assembly including the spring loaded seal assembly of the preferred embodiment of the present invention.

Reference is now made to FIG. 1 of the drawings, illustrating a wheel spindle assembly 10 including a support ring 12, typically attached to a portion of a vehicle (not shown). A pair of anti-friction bearings 14, 16 provide rotary support for spindle 18. As is well understood in the art, the spindle 18 in turn supports the wheel (not shown) of the vehicle by a plurality of mounting studs 20.

In accordance with the primary subject of the present invention, a spring loaded seal assembly, generally designated by the reference numeral 22, seals the inside lubricated chamber of the spindle assembly 10. It will be understood by those skilled in the art and in accordance with the present description, that the seal assembly 22 of the present invention is particularly adapted for use in the typical hostile environment of a motor vehicle. The seal assembly 10 effectively prevents the entry of salt and other contaminants into the sealed chamber to protect the bearings 14, 16. On the other hand, it will also be understood that the bearing assembly 22 can be used in other environments and to protect other types of bearing assemblies, or any other rotatable coaxial parts.

During normal operations of the wheel spindle assembly 10, relative movement within the bearings 14, 16 creates friction, and in turn, heat. Thus, as is customary, the inside chamber of the wheel bearing assembly 10 is packed with a high grade grease lubricant. Due to this grease packing, a seal assembly must be effective in both preventing a lubricant from leaking toward the outside, as well as preventing foreign contaminants from entering the chamber. Thus, it is desirable to have both inwardly and outwardly directed sealing interfaces to improve seal effectiveness. As will be apparent from the following description, the seal assembly 22 of the present invention uniquely provides spring biased inwardly and outwardly directed sealing interfaces that are extremely effective and stable.

Figure 1A:
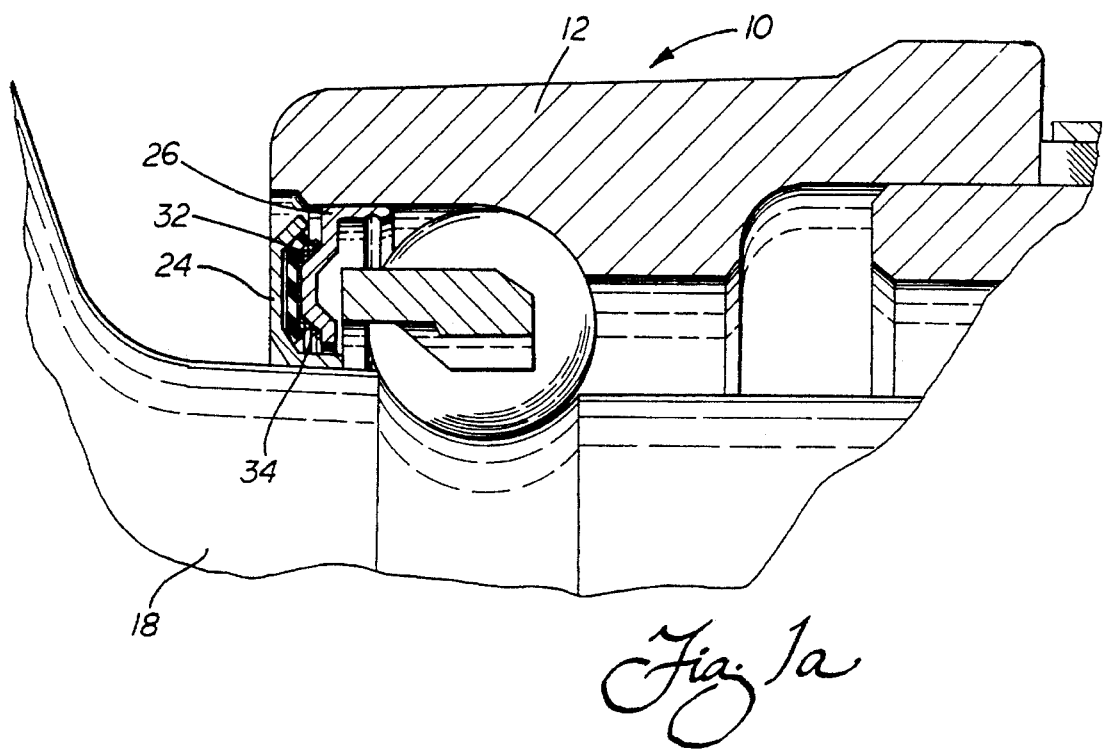
FIG. 1a is a cutaway cross-sectional view that is enlarged for increased detail and showing in particular the seal assembly as it is positioned between the relatively rotatable vehicle support ring and the wheel spindle.
Figure 2:
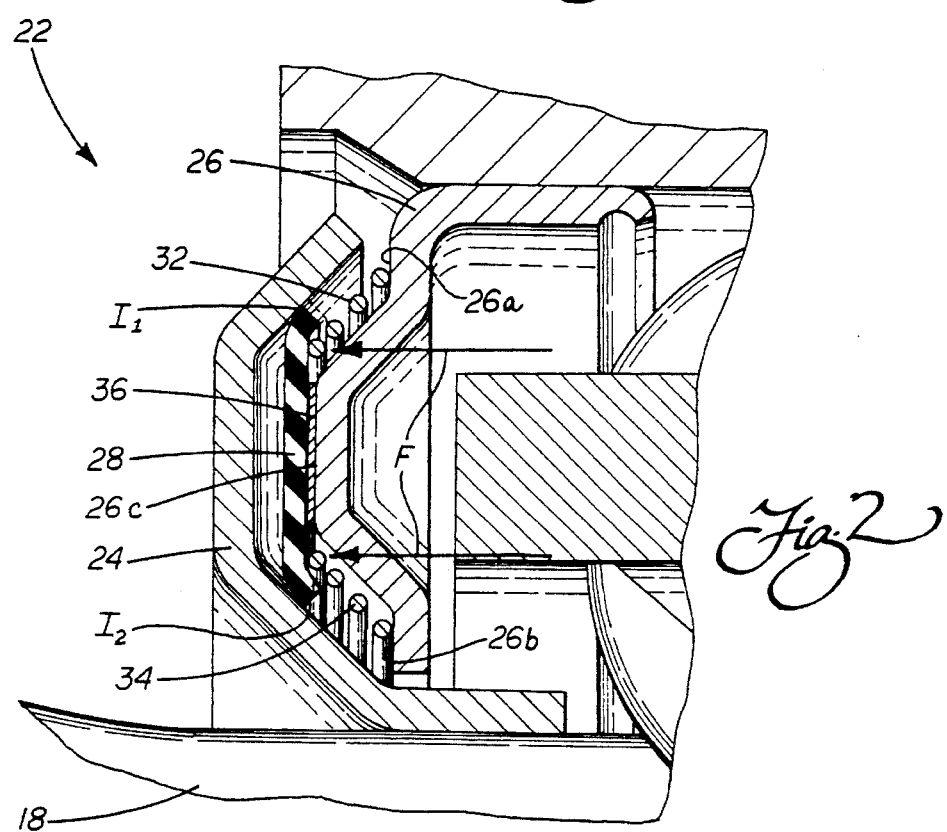
FIG. 2 is a cross-sectional view, enlarged still further, to show more detail of the spring loaded seal assembly in position for use.

The enlarged cutaway, cross sectional view of FIG. 1a illustrates some additional details of the seal assembly 22. A radially inner annular casing 24, is preferably press fitted into position on spindle 18, and a radially outer annular casing 26 is similarly press fitted into position within support ring 12. The inner and outer casings 24, 26 are shaped so as to compliment one another, forming a C-shaped recess in cross section. It is within this recess that the novel sealing action of the present invention takes place. With reference also to FIG. 2, it can be seen that an annular wafer seal 28 of elastomeric material is disposed within the C-shaped recess and includes inner and outer peripheral edges or lips that are biased in sealing contact with an adjacent sealing surface of the inner casing 24. This provides the two sealing interfaces along the circular lines of contact providing the two highly efficient lines of contact sealing. The seal is formed of rubber, or other suitable resilient material, such as polyltetrafluoroethylene (PTFE) plastic.

In the preferred embodiment of the invention, inside and outside frustoconical compression springs 32, 34, are compressed between the outer casing 26 and the respective inner and outer peripheral edges of the annular wafer seal 28. In this manner, a biasing force F is provided to strongly urge the peripheral edges of wafer seal 28 into tight sealing contact with the inner casing 24. This force compliments or assists the biasing force of the inherent elastic memory within the seal 28. The force F exerted by the springs 32, 34 adding to the natural biasing force of the seal 28 effectively increases the overall effectiveness of the two sealing interfaces.

Preferably, the springs 32, 34 are made of metal such as spring steel, treated to be corrosion resistant, and thus not susceptible to deterioration caused by exposure to foreign corrosive materials such as salt or other road debris. Also, the springs 32, 34 exhibit a long life, and thus resist prematurely losing their resiliency due to the continuous flexing during use. To put it another way, the springs 32, 34 are designed to remain resilient for a long period of time and thus help maintain the flexed seal edges of the seal 28 in sealing contact Full sealing contact is maintained for a longer period of time, effectively increasing the useful life of the seal assembly 10.

Advantageously, the inner and outer peripheral edges of the wafer seal 28 contact the adjacent sealing surface at substantially the same contact angle. Outer sealing interface $I_1$ is directed outwardly to effectively provide the line contact barrier against the entry of salt or other road debris; whereas, inner sealing interface $I_2$ is directed inwardly to effectively provide a barrier against the exit of lubricant from the internal chamber of the bearing assembly 10.

Also in the preferred embodiment of the present invention, the outer casing 26 includes inner and outer annular lands 26a, 26b. These lands provide stable surfaces forming the base against which the springs 32, 34 are compressed to urge the inner and outer peripheral edges of wafer seal 28 into sealing contact with the inner casing 24.

As can be seen by reference to FIG. 2, attachment of the wafer seal 28 to the outer casing 26 is desirable. In particular, in the preferred embodiment, the center ring section of the annular wafer seal 28 is attached by a substantially continuous adhesive ring 36, to a flat annular face 26c of the outer casing 26.

Figure 3:
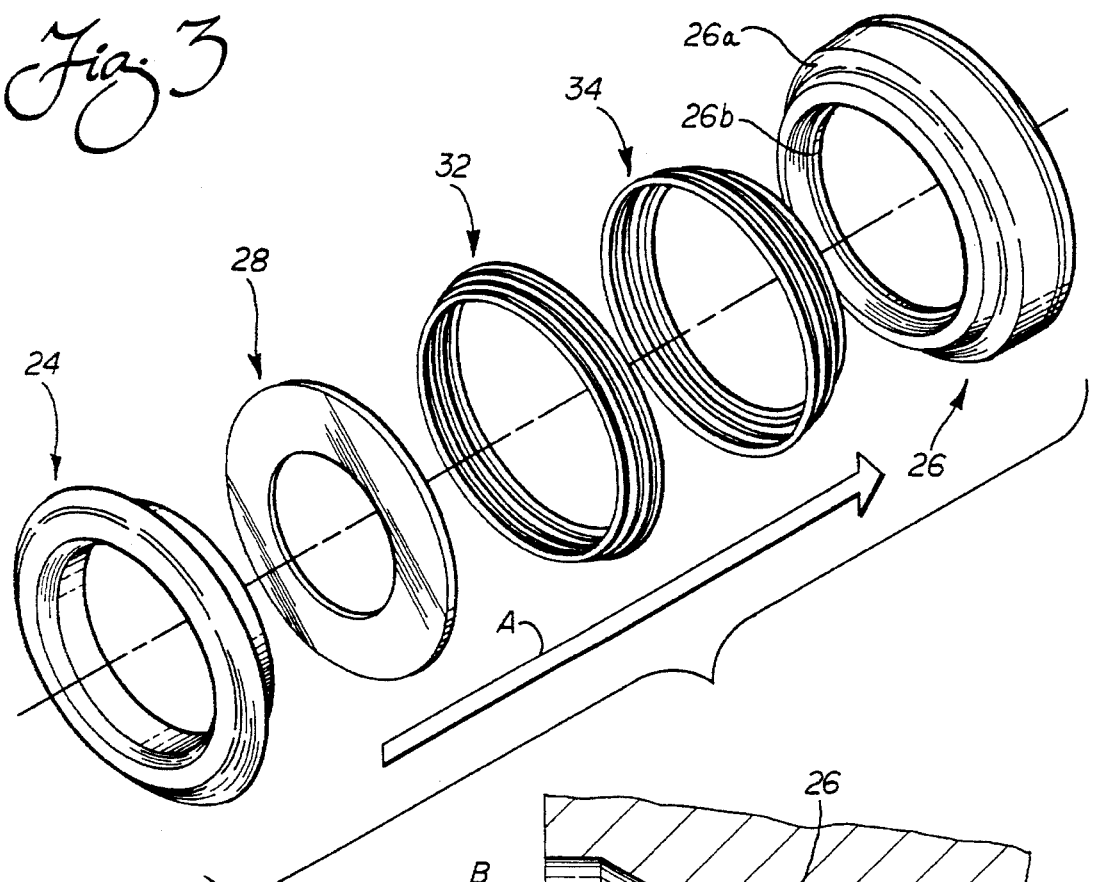
FIG. 3 is an exploded view of the spring loaded seal assembly of the present invention illustrating the two casings with the wafer seal and inside and outside springs therebetween.
Figure 3A:
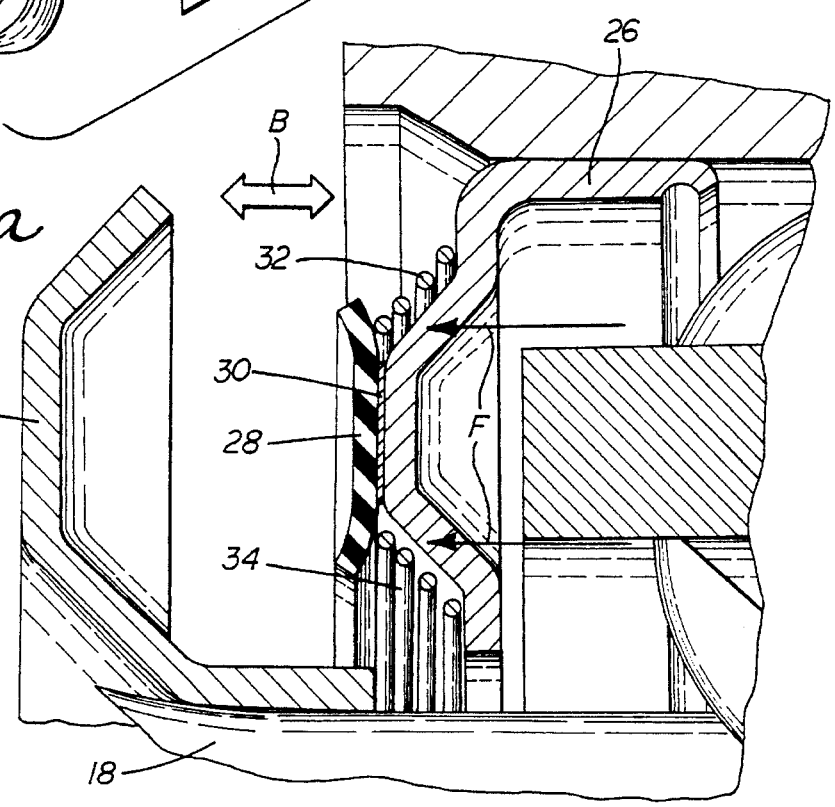
FIG. 3a is an enlarged cross-sectional view, with the two casings separated in a similar yet exploded view of FIG. 2, just prior to being assembled during installation in the wheel spindle assembly.

As can best be seen by viewing FIGS. 3 and 3a, and as briefly described above, during assembly as the annular wafer seal 28 is moved toward outer casing 26, as indicated by action arrow A, the springs 32, 34 are captured and compressed. The seal 28 is then attached to the outer casing 26, and in turn, the inside and outside springs 32, 34 are held in position therebetween. The compressive force F of the inside and outside springs 32, 34, cause inner and outer peripheral edges of the wafer seal 28 to be flexed away from the outer casing 26 (see FIG. 3a).

During the final assembly, simple relative movement between the two casings 24, 26 is all that is required, as illustrated by the final assembly action arrow B. Upon contact with the inner casing 24, the peripheral edges of the wafer seal 28 are flexed against its inner sealing surface, thus reversing the peripheral edges so as to be pressed back toward the outer casing 26. The spring members 32, 34 thereby provide the resilient dual biasing force F against the peripheral edges of the wafer seal 28. Since the springs are held in position temporarily between the wafer seal 28 and the outer casing 26, the entire final assembly action can be quickly and easily accomplished.

To briefly recap the functions of the annular wafer seal 28, the inner peripheral edge provides an inwardly directed sealing interface which contains the lubricant within the sealed chamber of the wheel spindle assembly 10. The outer peripheral edge provides an outwardly directed sealing interface which prevents entry of salt and other debris. The effectiveness of these seal interfaces is facilitated by the compressive biasing force F of the respective inside and outside annular springs 32, 34. Thus, this arrangement maximizes the sealing effectiveness and integrity of the seal 28. In addition, the useful life of the seal 28 is increased because the springs are resistant to deterioration and loss of resiliency. Accordingly, strong seal interfaces are maintained for a longer period of time than some seals of the prior art, resulting in a longer overall useful life of the seal assembly 22.

In summary, the spring loaded seal assembly 22 of the present invention provides an exceptional advance in the art in terms of seal effectiveness and integrity. The nested casings 24, 26 compliment one another and form a C-shaped recess within which a wafer seal 28 can be positioned and held securely in place. The inner and outer peripheral edges of the wafer seal 28 are pressed into sealing contact with the inner casing 24 by the springs 32, 34. The seal effectiveness and integrity is increased due to the biasing force F of the springs 32, 34 and the useful life of the seal assembly 22 is substantially increased.

The foregoing description of a preferred embodiment of the invention has been presented for purposes of illustration and description. It is not intended to be exhaustive or to limit the invention to the precise form disclosed. Obvious modifications or variations are possible in light of the above teaching. The embodiment which was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A seal assembly for sealing two relatively rotatable coaxial parts comprising:

inner and outer annular casings nested together and forming a generally C-shaped recess in cross section;

an annular wafer seal disposed within the recess and having inner and outer peripheral edges that contact an adjacent sealing surface within the recess to form at least two sealing interfaces along circular lines of contact;

inside and outside frustoconical compression springs within said recess, said inside and outside compression springs being compressed between one of said inner and outer casings and the respective inner and outer edges of said annular wafer seal, whereby the force exerted by the frustoconical compression springs against the wafer seal increases seal effectiveness and integrity.

2. A seal assembly as in claim 1, wherein one of said inner and outer casings includes inside and outside radially extending annular lands from which said inside and outside springs extend axially to contact and urge said inner and outer peripheral edges into sealing contact with said adjacent sealing surface.

3. A seal assembly as in claim 2, wherein one of said inner and outer casings further includes a generally flat annular face between said inside and outside annular lands, said wafer seal including a center ring section, and means for attaching said center ring section to said annular face.

4. A method of assembling a seal assembly having inner and outer annular casings, an annular wafer seal, and inside and outside springs, said method comprising the steps of:

attaching a center section of said wafer seal to an annular face of one of said inner and outer casings;

placing said inside and outside springs between said casing and respective inner and outer peripheral edges of said wafer seal to urge said peripheral edges away from said one casing;

pressing said inner or outer casings into nested relationship to forming a C-shaped recess in cross section and causing the peripheral edges of said wafer seal to flex in the opposite direction within the recess against an adjacent sealing surface of the outer casing and forming two sealing interfaces along circular lines of contact;

whereby the various components of the seal assembly are easily assembled and installed.

* * * * *